United States Patent
Kang et al.

(10) Patent No.: US 9,803,308 B2
(45) Date of Patent: *Oct. 31, 2017

(54) BALANCER AND WASHING MACHINE HAVING THE SAME

(71) Applicant: SAMSUNG ELECTRONICS CO., LTD., Suwon-si, Gyeonggi-do (KR)

(72) Inventors: Jeong Hoon Kang, Seoul (KR); Min Sung Kim, Yongin-si (KR); Dong Ha Jung, Seongnam-si (KR); Doo Young Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

This patent is subject to a terminal disclaimer.

(21) Appl. No.: 14/163,378

(22) Filed: Jan. 24, 2014

(65) Prior Publication Data

US 2014/0208809 A1 Jul. 31, 2014

(30) Foreign Application Priority Data

Jan. 25, 2013 (KR) .......................... 10-2013-0008719

(51) Int. Cl.
*D06F 37/22* (2006.01)
*D06F 37/20* (2006.01)
(Continued)

(52) U.S. Cl.
CPC ............ *D06F 37/225* (2013.01); *D06F 37/20* (2013.01); *D06F 37/22* (2013.01); *D06F 37/203* (2013.01);
(Continued)

(58) Field of Classification Search
CPC ........ D06F 37/20; D06F 37/203; D06F 37/22; D06F 37/225; D06F 37/24; D06F 37/245; D06F 2222/00; F16F 15/363
See application file for complete search history.

(56) References Cited

U.S. PATENT DOCUMENTS 5,806,349 A * 9/1998 Kim .................... D06F 37/245
68/23.2
6,005,749 A * 12/1999 Ikuta .................... F16F 15/363
310/51

(Continued)

FOREIGN PATENT DOCUMENTS

CN 102443999 5/2012
EP 0 811 717 A2 12/1997

(Continued)

OTHER PUBLICATIONS

European Search Report dated Jul. 17, 2015 in corresponding European Application No. 14152412.4.

(Continued)

*Primary Examiner* — Joseph L Perrin
(74) *Attorney, Agent, or Firm* — Staas & Halsey LLP

(57) ABSTRACT

A balancer includes a balancer housing having an annular channel defined therein, at least one mass movably disposed in the channel, and at least one magnet coupled to one side of the balancer housing to restrain movement of the mass along the channel when rotational speed of a drum of the washing machine is within a predetermined range. The magnet includes a plurality of unit magnets arranged in a circumferential direction of the balancer housing.

3 Claims, 19 Drawing Sheets

(51) Int. Cl.
*D06F 37/24* (2006.01)
*F16F 15/36* (2006.01)

(52) U.S. Cl.
CPC ............ *D06F 37/24* (2013.01); *D06F 37/245* (2013.01); *D06F 2222/00* (2013.01); *F16F 15/363* (2013.01)

(56) References Cited

U.S. PATENT DOCUMENTS

| | | | |
|---|---|---|---|
| 6,304,162 B1* | 10/2001 | Nakatsuka | H01F 7/02 335/302 |
| 6,510,122 B1* | 1/2003 | Yamauchi | G11B 17/028 369/266 |
| 2001/0038601 A1* | 11/2001 | Kikuchi | F16F 15/363 720/701 |
| 2012/0084926 A1 | 4/2012 | Lee et al. | |
| 2012/0192362 A1 | 8/2012 | Lee et al. | |
| 2012/0278996 A1 | 11/2012 | Park et al. | |
| 2013/0174690 A1* | 7/2013 | Yoshinari | D06F 37/245 74/572.4 |

FOREIGN PATENT DOCUMENTS

| | | |
|---|---|---|
| EP | 0 811 717 A3 | 6/1998 |
| EP | 2 441 872 A2 | 4/2012 |
| EP | 2 752 516 A1 | 7/2014 |
| EP | 2 441 872 A3 | 10/2014 |
| GB | 2 410 750 | 8/2005 |
| KR | 10-0807256 | 2/2008 |
| WO | WO 2012/089444 | 7/2012 |
| WO | WO 2014/107004 | 7/2014 |

OTHER PUBLICATIONS

International Search Report dated Apr. 14, 2014 in corresponding International Application No. PCT/KR2014/000613.
Australian Office Action dated Dec. 24, 2015 in corresponding Australian Application No. 2014210522.
Russian Office Action dated Sep. 20, 2016 from Russian Patent Application No. 2015131014/12(047722), 8 pages.
European Office Action dated Nov. 22, 2016 from European Patent application No. 14152412.4, 4 pages.
Chinese Office Action dated Dec. 27, 2016 from Chinese Patent Application No. 201410039238.5, 13 pages.
Russian Office Action dated Jan. 31, 2017 from Russian Patent Application No. 12(047722), 11 pages.
European Office Action dated Jul. 7, 2017 in related European Application No. 14 152 412.4.
Chinese Notification of Due Registration Formalities and of Granting of Patent Right to Invention dated Sep. 6, 2017 in related Chinese Application No. 201410039238.5.

* cited by examiner

BALANCER AND WASHING MACHINE HAVING THE SAME

CROSS-REFERENCE TO RELATED APPLICATIONS

This application claims the benefit of Korean Patent Application No. 10-2013-0008719, filed on Jan. 25, 2013 in the Korean Intellectual Property Office, the disclosure of which is incorporated herein by reference.

BACKGROUND

1. Field

Embodiments of the present disclosure relate to a washing machine having a balancer to offset unbalanced load generated during rotation of a drum.

2. Description of the Related Art

A washing machine is a machine that washes clothes using electric power. Generally, the washing machine includes a cabinet forming the external appearance of the washing machine, a tub to contain wash water in the cabinet, a drum rotatably installed in the tub, and a motor to rotate the drum.

When the drum is rotated by the motor in a state in which laundry is put in the drum together with detergent water, contaminants are removed from the laundry by friction between the laundry and the drum and between the laundry and wash water.

If the laundry is not uniformly distributed in the drum but accumulates at one side during rotation of the drum, vibration and noise are generated due to eccentric rotation of the drum. According to circumstances, parts, such as the drum or the motor, of the washing machine may be damaged.

For this reason, the washing machine has a balancer that offsets unbalanced load generated in the drum to stabilize rotation of the drum.

SUMMARY

It is an aspect of the present disclosure to provide a balancer with improved performance and a washing machine having the same.

Additional aspects of the disclosure will be set forth in part in the description which follows and, in part, will be apparent from the description, or may be learned by practice of the disclosure.

In accordance with one aspect of the present disclosure, a balancer, mounted to a drum of a washing machine to offset unbalanced load generated in the drum during rotation of the drum, includes a balancer housing having an annular channel defined therein, at least one mass movably disposed in the channel, and at least one magnet coupled to one side of the balancer housing to restrain movement of the mass along the channel when rotational speed of the drum is within a predetermined range, wherein the magnet includes a plurality of unit magnets arranged in a circumferential direction of the balancer housing.

The unit magnets may be disposed in tight contact such that no gap is present between the respective unit magnets.

Each unit magnet may have a pair of N and S poles.

Each unit magnet may have an inside surface formed in an arc shape.

Each unit magnet may have an outside surface formed in an arc shape.

Each unit magnet may have an inside surface formed in a flat shape.

Each unit magnet may have an outside surface formed in a flat shape.

The magnet may include a first magnet and a second magnet disposed symmetrically at the balancer housing.

The balancer housing may include a first housing opened at one side thereof and a second housing to cover the first housing to define the annular channel and the magnet may be coupled to a rear surface of the first housing.

The first housing may be provided at the rear surface thereof, to which the magnet is coupled, with a magnet receiving groove to receive the magnet.

The balancer may include at least one groove formed at an inner surface of the first housing to receive the mass such that movement of the mass along the channel is restrained when rotational speed of the drum is within a predetermined range, wherein the magnet may disposed at a position corresponding to the groove.

Each unit magnet may include a first interface surface contacting a rear surface of the first housing and a second interface surface contacting a neighboring unit magnet.

In accordance with another aspect of the present disclosure, a washing machine includes a cabinet, a drum rotatably disposed in the cabinet, and a balancer coupled to the drum to offset unbalanced load generated in the drum during rotation of the drum, wherein the balancer includes a balancer housing having an annular channel defined therein, at least one mass movably disposed in the channel, and at least one magnet coupled to one side of the balancer housing to restrain movement of the mass along the channel when rotational speed of the drum is within a predetermined range, wherein the magnet has a plurality of N and S poles.

The N and S poles may be alternately arranged in a circumferential direction of the balancer housing.

The magnet may be coupled to a rear surface of the balancer housing.

The magnet may include a first magnet and a second magnet disposed symmetrically at the balancer housing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
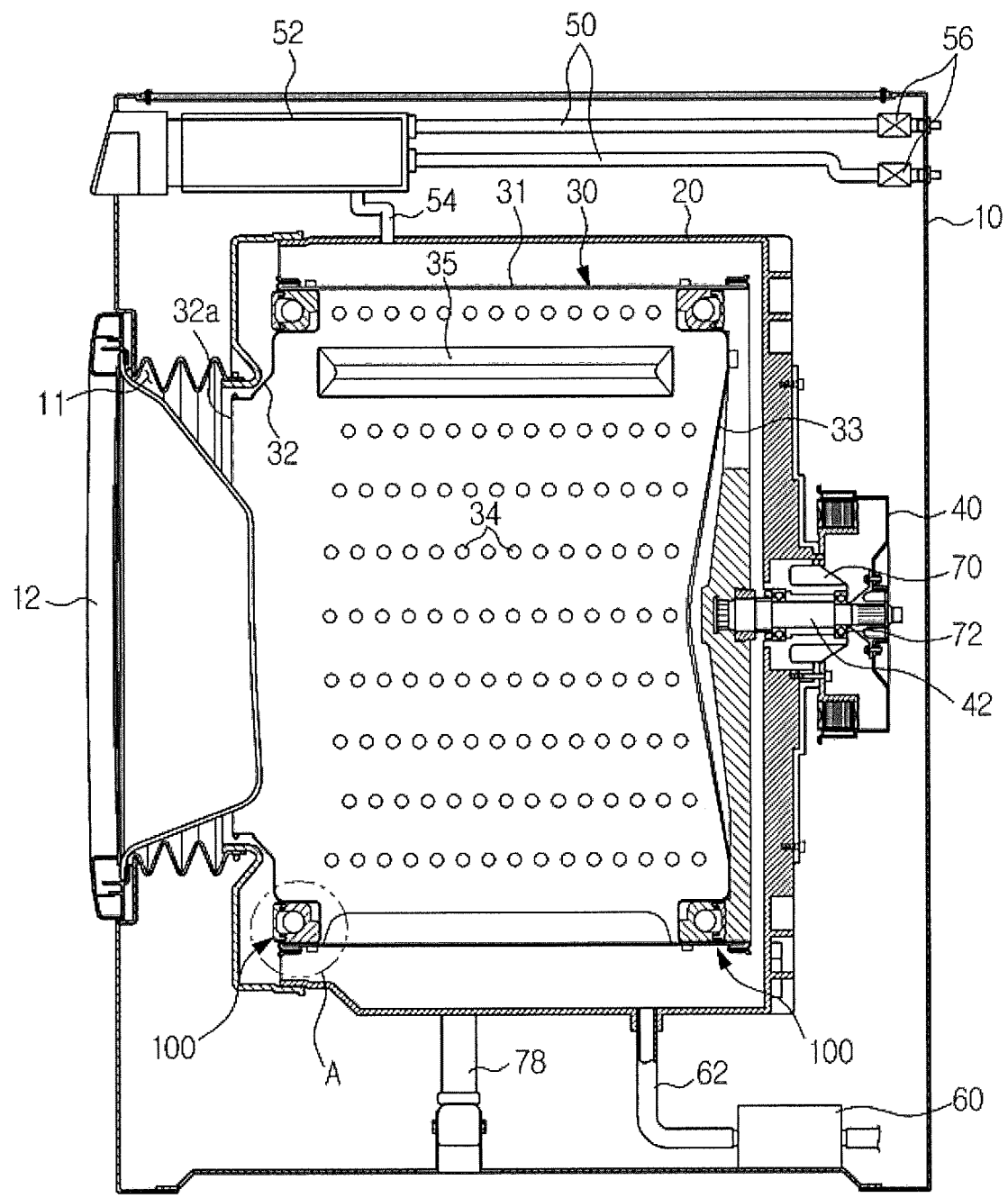
FIG. 1 is a view showing the construction of a washing machine according to an embodiment of the present disclosure.

Reference will now be made in detail to the embodiments of the present disclosure, examples of which are illustrated in the accompanying drawings, wherein like reference numerals refer to like elements throughout.

FIG. 1 is a view showing the construction of a washing machine according to an embodiment of the present disclosure.

As shown in FIG. 1, a washing machine 1 includes a cabinet 10 forming the external appearance thereof, a tub 20 disposed in the cabinet 10, a drum 30 rotatably disposed in the tub 20, and a motor 40 to drive the drum 30.

An introduction port 11, through which laundry is introduced into the drum 30, is formed at the front of the cabinet 10. The introduction port 11 is opened and closed by a door 12 installed at the front part of the cabinet 10.

Above the tub 20 is installed a water supply pipe 50 to supply wash water to the tub 20. One side of the water supply pipe 50 is connected to a water supply valve 56 and the other side of the water supply pipe 50 is connected to a detergent supply unit 52.

The detergent supply unit 52 is connected to the tub 20 via a connection pipe 54. Water, supplied through the water supply pipe 50, is supplied into the tub 20 together with detergent via the detergent supply unit 52.

Under the tub 20 are provided a drainage pump 60 and a drainage pipe 62 to discharge water in the tub 20 from the cabinet 10.

The drum 30 includes a cylinder part 31, a front plate 32 disposed at the front of the cylinder part 31, and a rear plate 33 disposed at the rear of the cylinder part 31. An opening 32a, through which laundry is introduced and removed, is formed at the front plate 32. A drive shaft 42 to transmit power from the motor 40 to the drum 30 is connected to the rear plate 33.

The drum 30 is provided at the circumference thereof with a plurality of through holes 34, through which wash water flows. The drum 30 is provided at the inner circumference thereof with a plurality of lifters 35, by which laundry is raised and dropped when the drum 30 is rotated.

The drive shaft 42 is disposed between the drum 30 and the motor 40. One end of the drive shaft 42 is connected to the rear plate 33 of the drum 30 and the other end of the drive shaft 42 extends to the outside of the rear wall of the tub 20. When the drive shaft 42 is driven by the motor 40, the drum 30 connected to the drive shaft 42 is rotated about the drive shaft 42.

At the rear wall of the tub 20 is installed a bearing housing 70 to rotatably support the drive shaft 42. The bearing housing 70 may be made of an aluminum alloy. The bearing housing 70 may be inserted into the rear wall of the tub 20 when the tub 20 is injection molded. Between the bearing housing 70 and the drive shaft 42 are installed bearings 72 to smoothly rotate the drive shaft 42.

The tub 20 is supported by a damper 78. The damper 78 is connected between the inside bottom of the cabinet 10 and the outer surface of the tub 20.

During a washing cycle, the motor 40 rotates the drum 30 in alternating directions at low speed. As a result, laundry in the drum 30 is repeatedly raised and dropped so that contaminants are removed from the laundry.

During a spin-drying cycle, the motor 40 rotates the drum 30 in one direction at high speed. As a result, water is separated from laundry by centrifugal force applied to the laundry.

If the laundry is not uniformly distributed in the drum 30 but accumulates at one side when the drum 30 is rotated during spin-drying, rotation of the drum 30 is unstable, generating vibration and noise.

For this reason, the washing machine 1 includes a balancer 100 to stabilize rotation of the drum 30.

Figure 2:
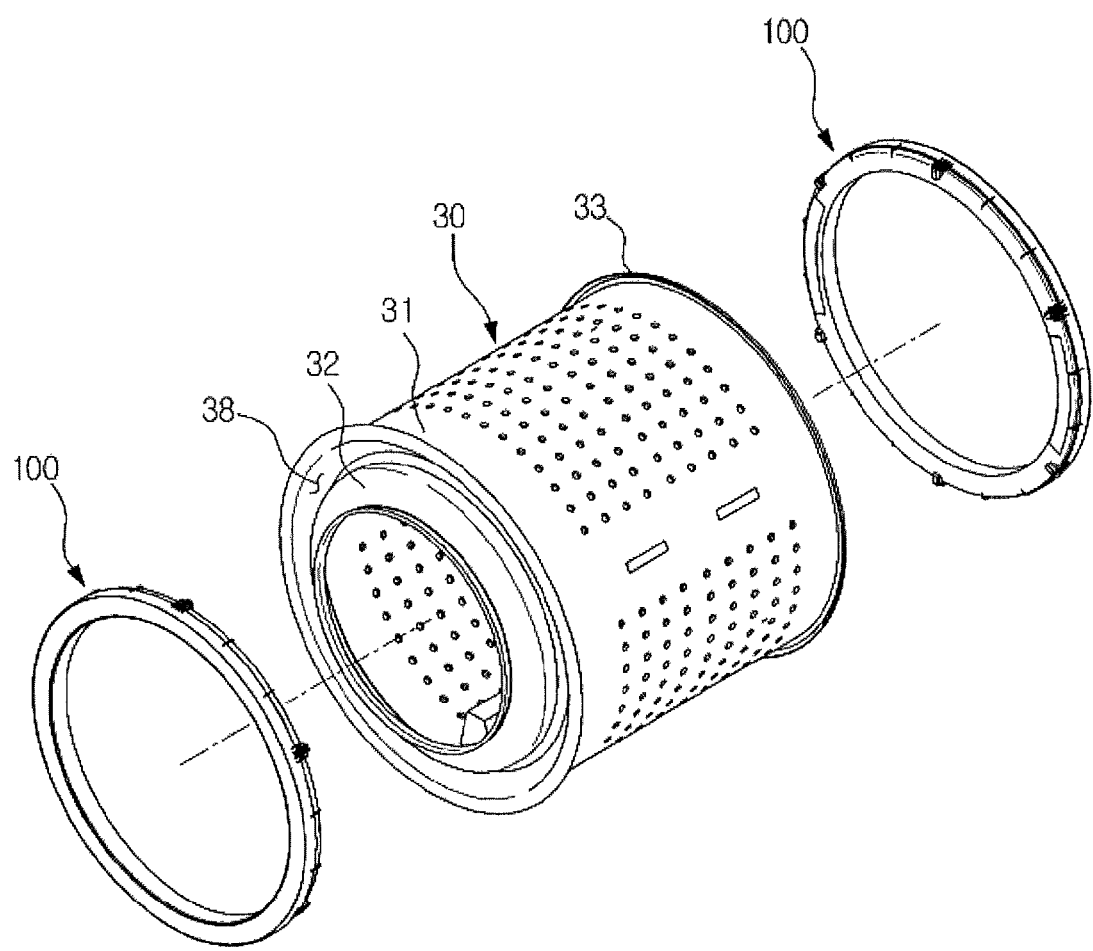
FIG. 2 is an exploded perspective view showing a drum and a balancer according to an embodiment of the present disclosure.
Figure 3:
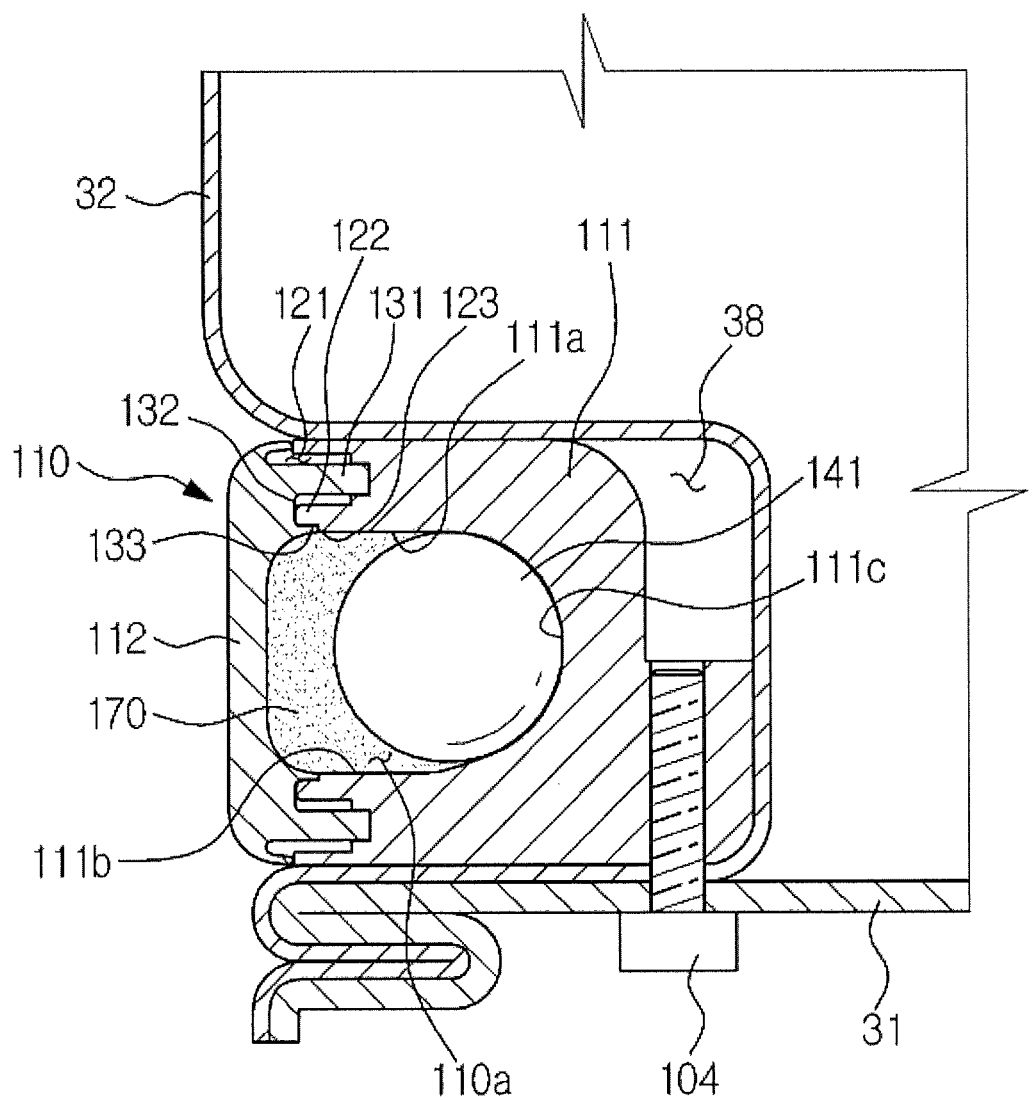
FIG. 3 is an enlarged view showing part A of FIG. 1.
Figure 4:
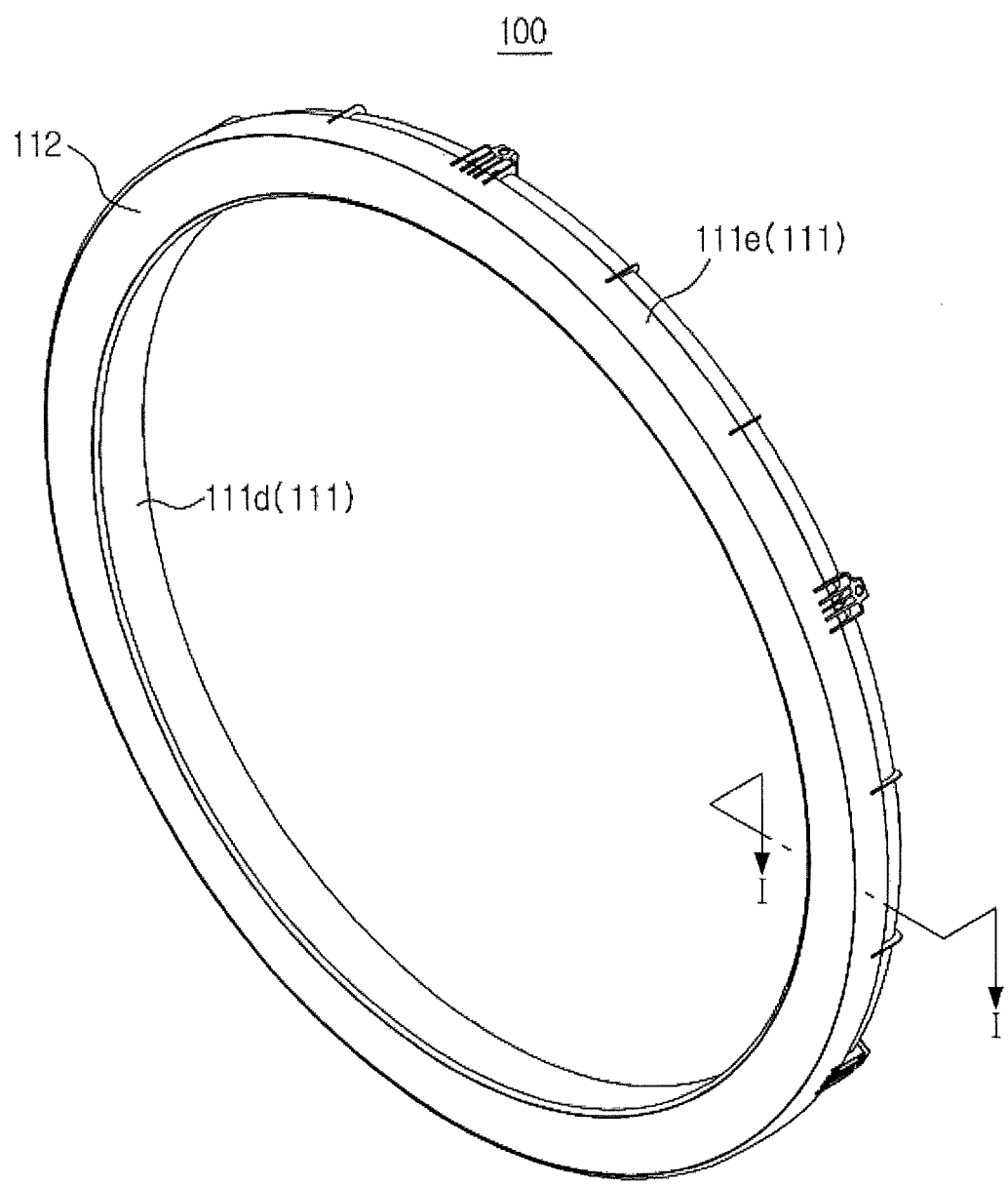
FIG. 4 is a perspective view showing the balancer according to the embodiment of the present disclosure.
Figure 5:
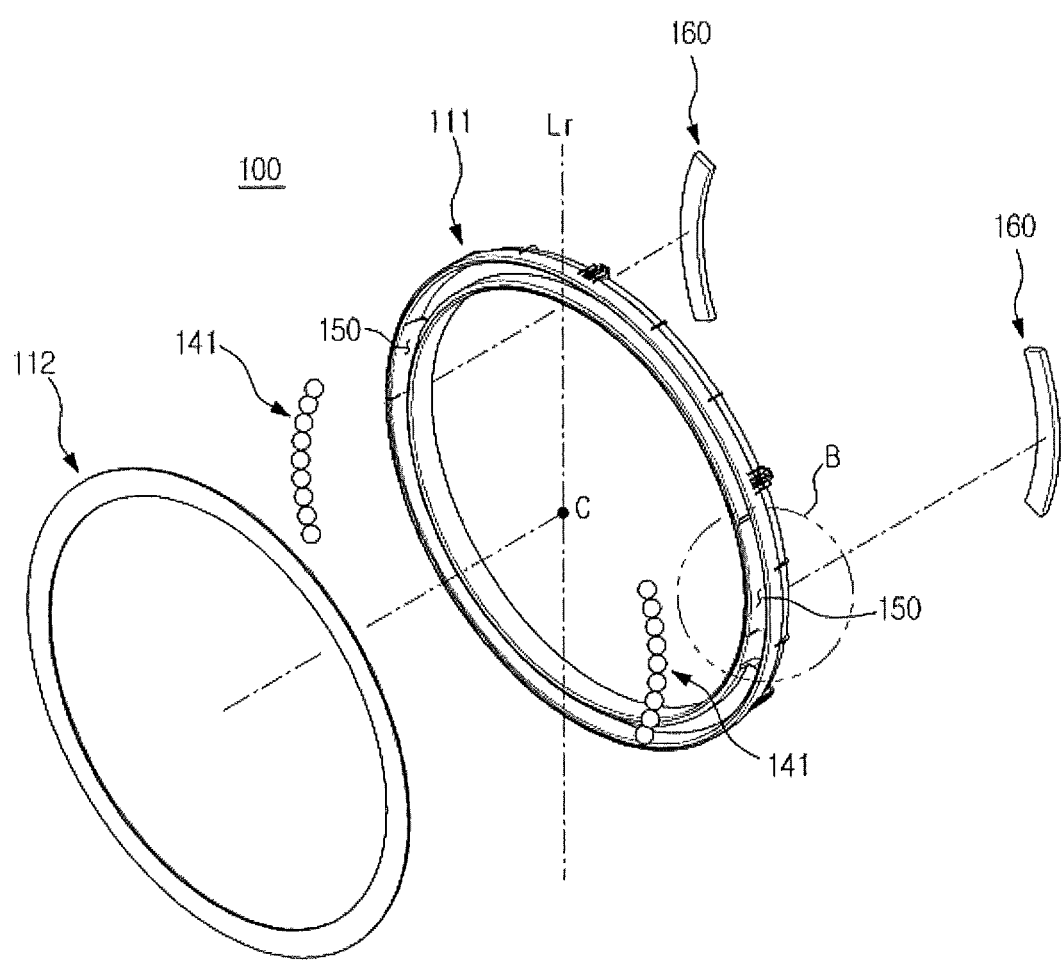
FIG. 5 is an exploded perspective view of the balancer shown in FIG. 4.
Figure 6:
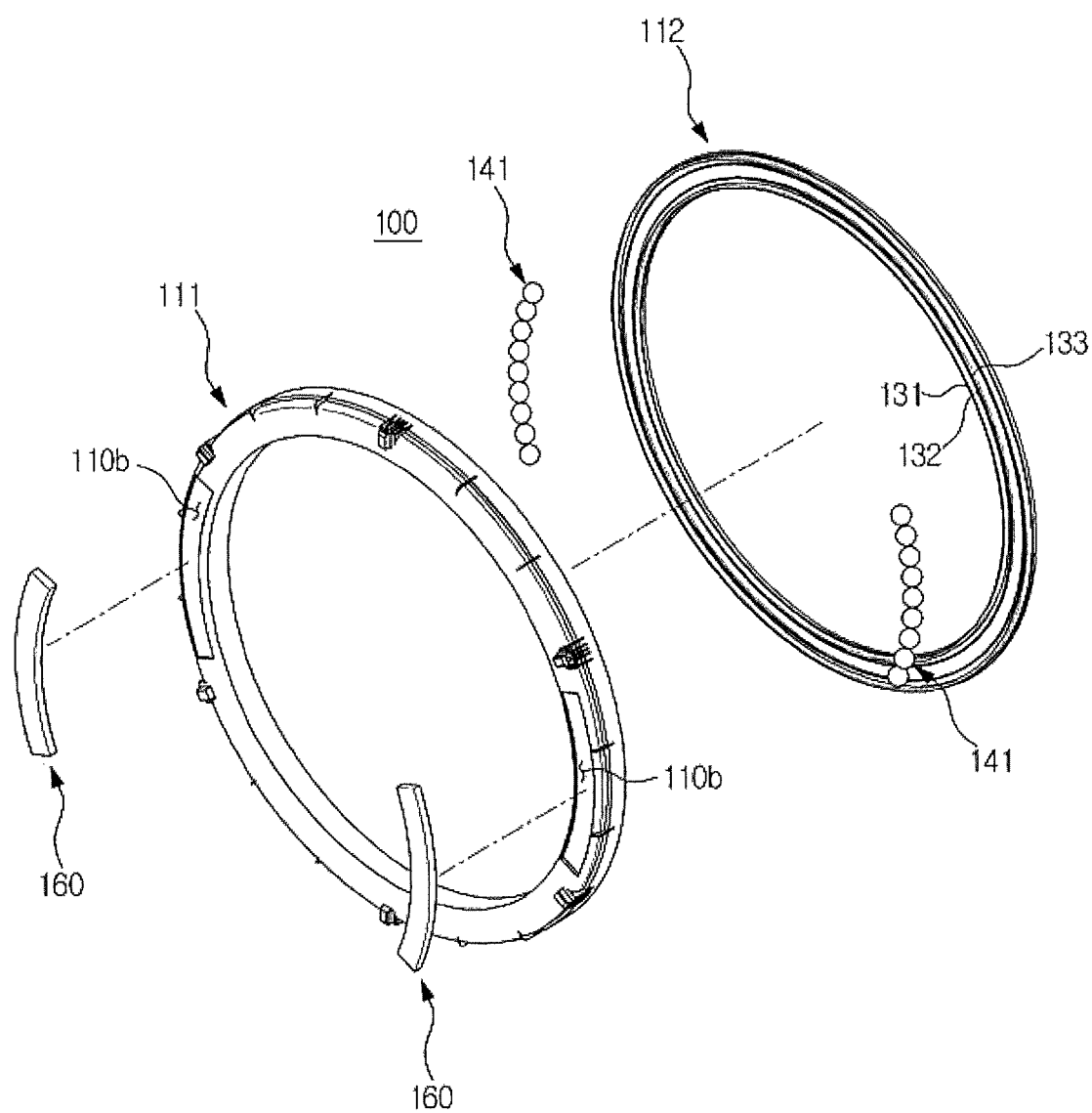
FIG. 6 is an exploded perspective view of FIG. 5 when viewed from another angle.
Figure 7:
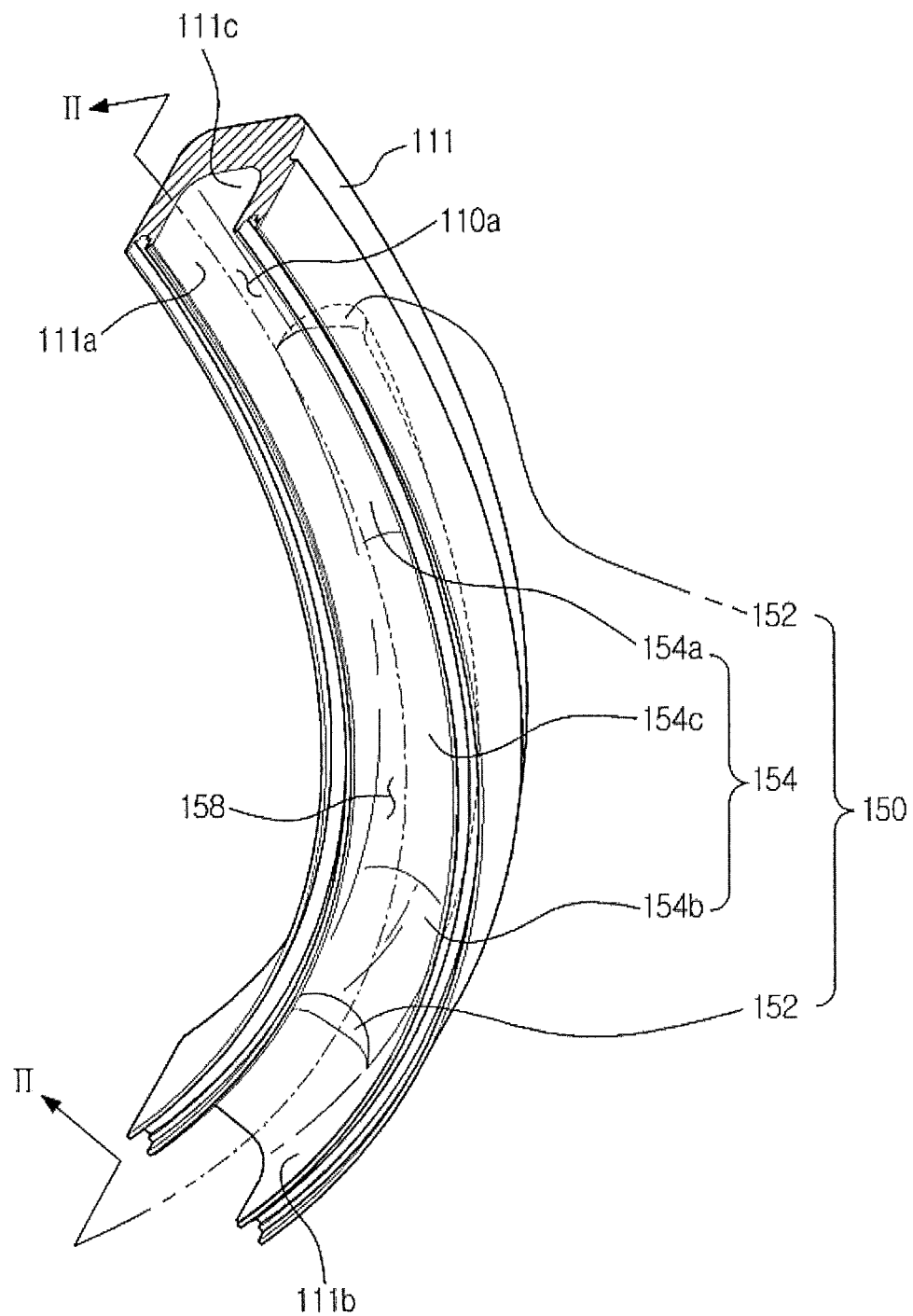
FIG. 7 is an enlarged view showing part B of FIG. 5.
Figure 8:
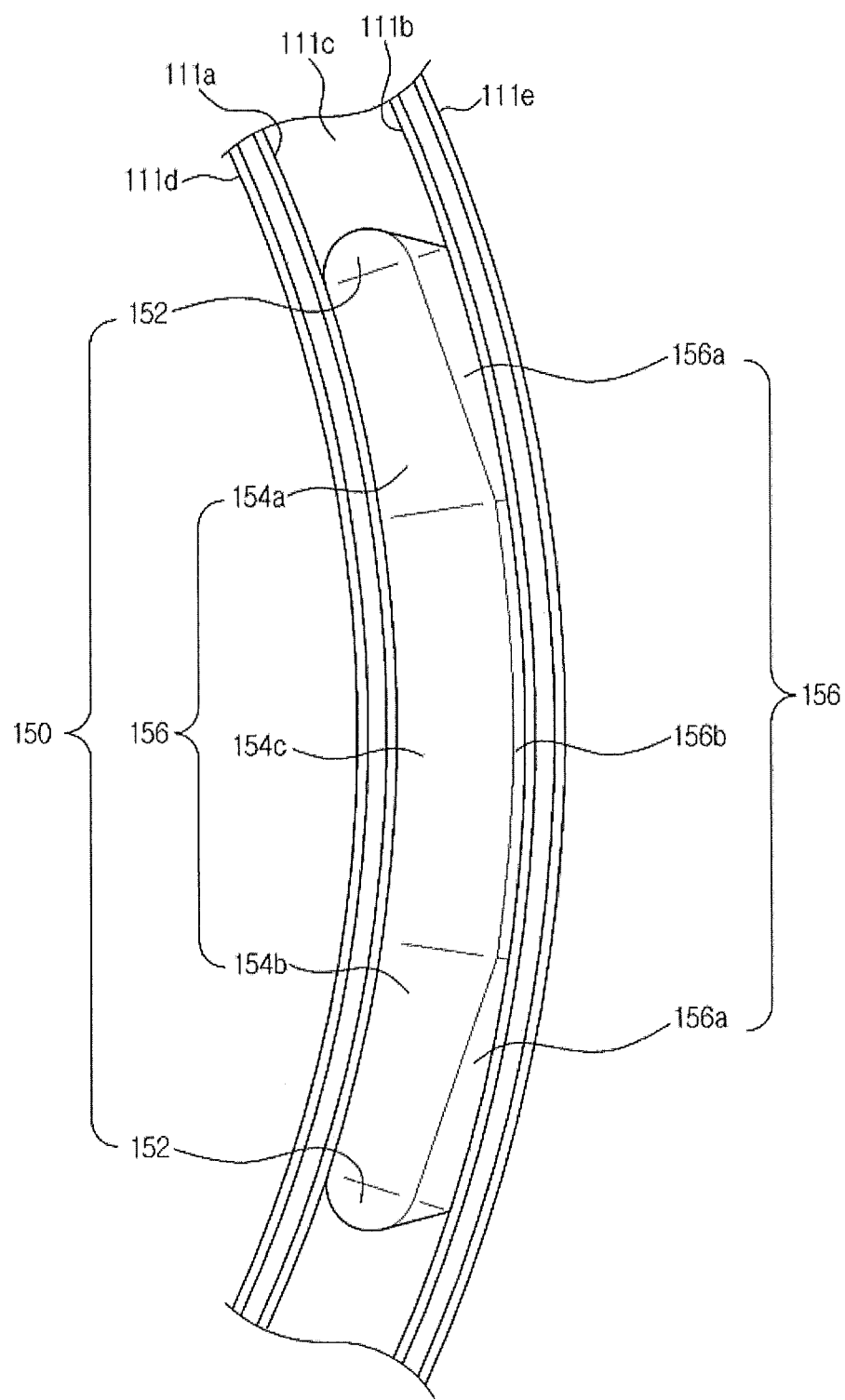
FIG. 8 is a front view of FIG. 7.
Figure 9:
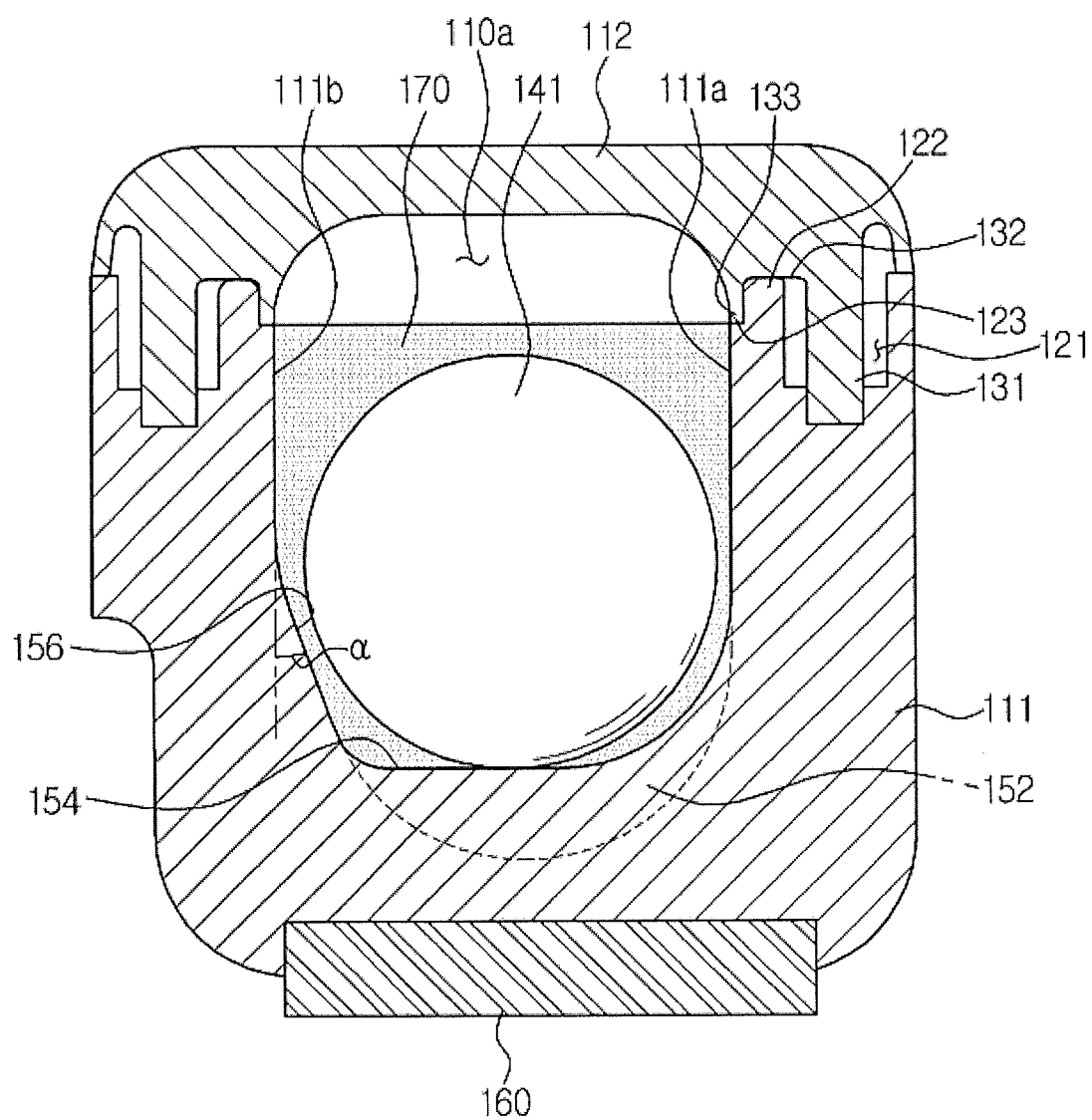
FIG. 9 is a sectional view taken along line I-I of FIG. 4.
Figure 10:
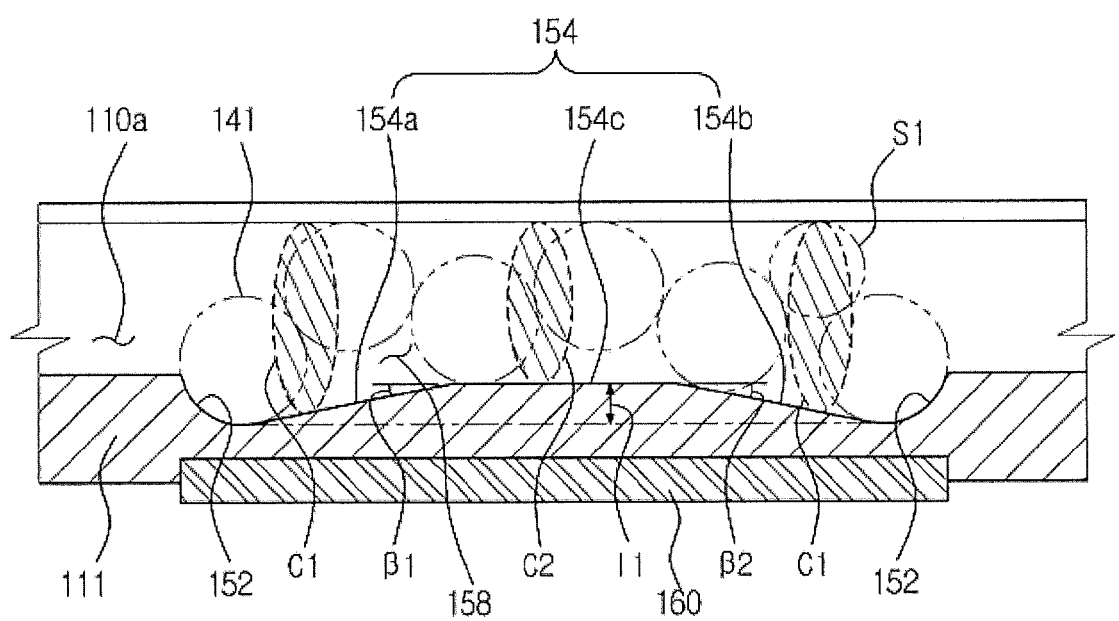
FIG. 10 is a sectional view taken along line II-II of FIG. 7.
Figure 11:
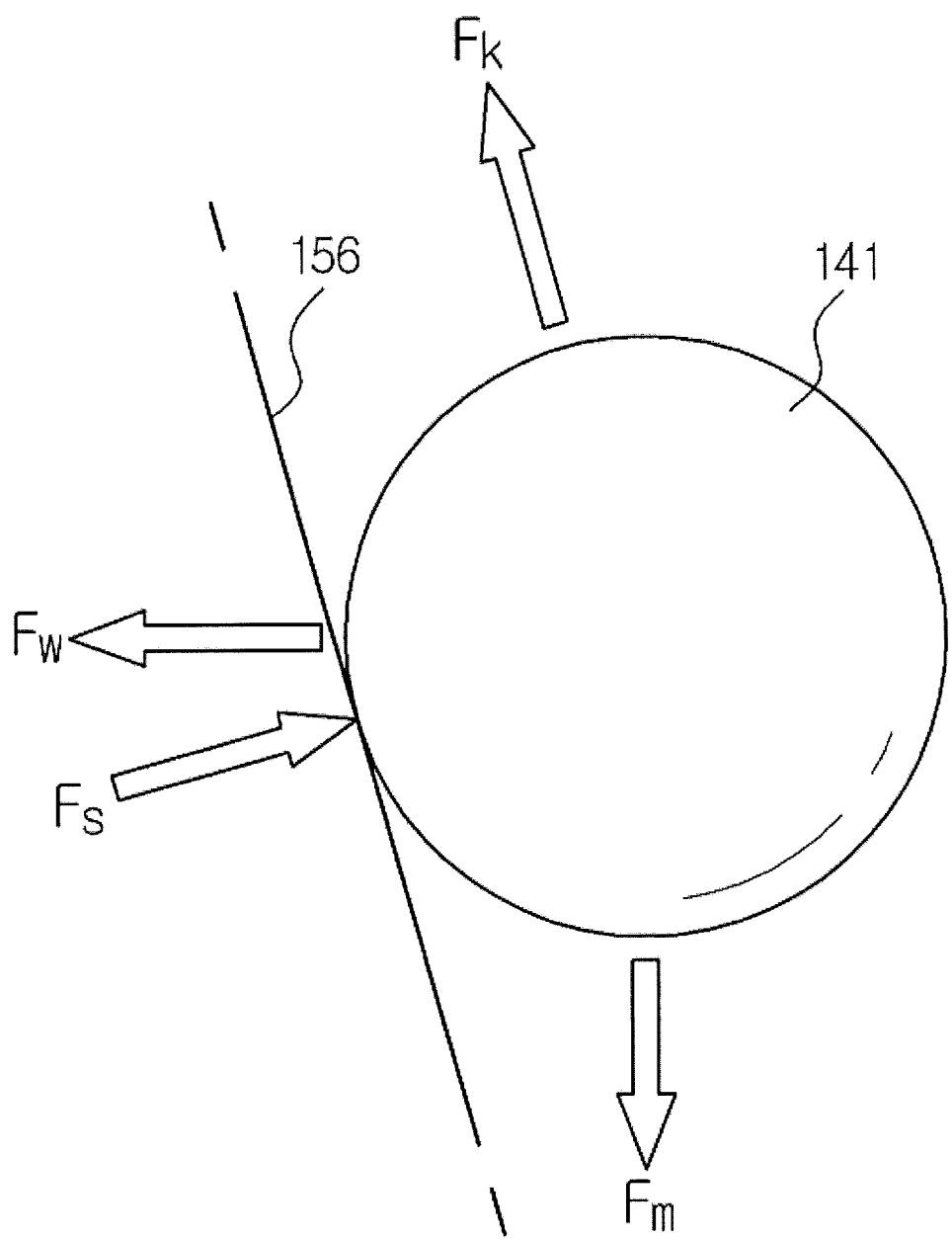
FIG. 11 is a view illustrating a relationship among centrifugal force, magnetic force, and supporting force generated by an inclined sidewall.

FIG. 2 is an exploded perspective view showing a drum and a balancer according to an embodiment of the present disclosure and FIG. 3 is an enlarged view showing part A of FIG. 1. FIG. 4 is a perspective view showing the balancer according to the embodiment of the present disclosure, FIG. 5 is an exploded perspective view of the balancer shown in FIG. 4, and FIG. 6 is an exploded perspective view of FIG. 5 when viewed from another angle. FIG. 7 is an enlarged view showing part B of FIG. 5 and FIG. 8 is a front view of FIG. 7. FIG. 9 is a sectional view taken along line I-I of FIG. 4 and FIG. 10 is a sectional view taken along line II-II of FIG. 7. FIG. 11 is a view illustrating a relationship among centrifugal force, magnetic force, and supporting force generated by an inclined sidewall.

The balancer 100 may be mounted to the front plate 32 and/or the rear plate 33 of the drum 30. The balancer 100 mounted to the front plate 32 and the balancer 100 mounted to the rear plate 33 are the same. Hereinafter, therefore, a description will be given of the balancer 100 mounted to the front plate 32.

As shown in FIGS. 1 to 10, the balancer 100 includes a balancer housing 110 having an annular channel 110a and a plurality of masses 141 disposed in the annular channel 110a such that the masses 141 move along the annular channel 110a to perform a balancing function of the drum 30.

An annular recess 38, which is open at the front thereof, is formed at the front plate 32 of the drum 30. The balancer housing 110 is received in the recess 38. The balancer housing 110 may be coupled to the drum 30 by fixing members 104 such that the balancer housing 110 is securely fixed to the drum 30.

The balancer housing 110 includes a first annular housing 111 opened at one side thereof and a second housing 112 to cover the opening of the first housing 111. The inner surface of the first housing 111 and the inner surface of the second housing 112 define the annular channel 110a. The first housing 111 and the second housing 112 may be manufactured by injection molding of plastic, such as polypropylene (PP) or acrylonitrile butadiene styrene (ABS). In addition, the first housing 111 and the second housing 112 may be thermally welded to each other. In the following, the front surface of the balancer housing 110 is defined as a surface exposed forward when the balancer housing 110 is coupled to the drum 30 and the rear surface of the balancer housing 110, which is opposite to the front surface of the balancer housing 110, is defined as a surface facing the front plate 32 of the drum 30 when the balancer housing 110 is coupled to the drum 30. In addition, the side surface of the balancer housing 110 is defined as a surface connected between the front surface and the rear surface of the balancer housing 110.

The first housing 111 has first coupling grooves 121 formed at opposite sides of the channel 110a and the second housing 112 has first coupling protrusions 131 coupled in the first coupling grooves 121. Second coupling protrusions 122 are formed between the first coupling grooves 121 of the first housing 111 and the channel 110a. The second coupling protrusions 122 of the first housing 111 are coupled in second coupling grooves 132 formed at the insides of the first coupling protrusions 131 of the second housing 112. Third coupling grooves 123 are formed at the insides of the second coupling protrusions 122 adjacent to the channel 110a and the second housing 112 has third coupling protrusions 133 coupled in the third coupling grooves 123. In the above coupling structure, the first housing 111 and the second housing 112 may be securely coupled to each other and, in a case in which a fluid, such as oil, is contained in the channel 110a, leakage of the fluid may be prevented.

The first housing 111 includes a first inner surface 111a and a second inner surface 111b, which are opposite to each other and a third inner surface 111c connected between the first inner surface 111a and the second inner surface 111b. The first inner surface 111a corresponds to an inner circumference 111d of the first housing 111 and the second inner surface 111b corresponds to an outer circumference 111e of the first housing 111.

At least one selected from among the first inner surface 111a, the second inner surface 111b, and the third inner surface 111c is provided with a groove 150, in which the masses 141 are located such that the masses 141 are temporarily restrained. In FIGS. 7 and 8, the groove 150 is formed in the first inner surface 111a and the third inner surface 111c. However, embodiments of the present disclosure are not limited thereto. For example, the groove 150 may be formed in any one selected from among the first inner surface 111a, the second inner surface 111b, and the third inner surface 111c, in the first inner surface 111a and the third inner surface 111c, or in the first inner surface 111a, the second inner surface 111b, and the third inner surface 111c.

In order to prevent unbalanced load from being generated in the drum 30 due to the masses 141 in a state in which the masses 141 are located in each groove 150, grooves 150 may be disposed symmetrically on the basis of a virtual line Lr passing through a center of rotation of the drum 30 and perpendicular to the ground.

The groove 150 extends in a circumferential direction of the balancer housing 110 to receive at least two masses 141. The groove 150 includes first support parts 152 to support the masses 141 approximately in the circumferential direction and a radial direction of the balancer housing 110, a second support part 154 provided between the first support parts 152 to support the masses 141 approximately in the radial direction of the balancer housing 110, inclined surfaces 154a and 154b inclined inwardly of the channel 110a of the balancer housing 110, and at least one flat surface 154c provided between the inclined surfaces 154a and 154b.

The first support parts 152 are provided at the opposite ends of the groove 150 in the form of a step projection to prevent the masses 141 from being separated from the groove 150 when the number of rotations of the drum 30 is within a predetermined range.

The second support part 154 protrudes inwardly of the channel 110a. The inclined surfaces 154a and 154b and the flat surface 154c are provided at the second support part 154. The inclined surfaces 154a and 154b include a first inclined surface 154a and a second inclined surface 154b disposed in a state in which the flat surface 154c is located between the first inclined surface 154a and the second inclined surface 154b. Opposite ends of the first inclined surface 154a and the second inclined surface 154b are connected to the first support parts 152 and the flat surface 154c. A first inclination angle β1 between the flat surface 154c and the first inclined surface 154a may be different from a second inclination angle β2 between the flat surface 154c and the second inclined surface 154b. A length I1 of the second support part 154 protruding inwardly of the channel may be between 1 mm and 3 mm.

The channel 110a includes a section increase portion 158 formed at a region thereof where the groove 150 is formed. The section increase portion 158 is a space defined in the channel 110a by the groove 150. The section increase portion 158 is formed in a shape corresponding to at least a portion of the mass 141. In the same manner as in the groove 150, each section increase portion 158 may extend in the circumferential direction of the balancer housing 110 to receive at least two masses 141 and section increase portions 158 may be disposed symmetrically on the basis of a virtual line Lr passing through a center of rotation of the drum 30.

A sectional area C1 at each end of the section increase portion 158 is greater than a sectional area C2 between opposite ends of the section increase portion 158 due to the first inclined surface 154a, the second inclined surface 154b, and the flat surface 154c provided at the second support part 154.

Since the second support part 154 is formed in a shape protruding inwardly of the channel 110a, a free space is generated between the masses 141 received in the groove 150 or the section increase portion 158. When the number of rotations per minute of the drum 30 deviates from a predetermined range, therefore, the masses 141 are smoothly separated from the groove 150 without sticking to the groove 150. As a result, the masses 141 move along the channel 110a to perform a balancing function of the drum 30.

The balancer housing 110 is provided at the rear surface thereof corresponding to the inner surface of the balancer housing 110, at which the groove 150 is formed, with a magnet receiving groove 110b to receive a magnet such that the magnet is coupled to the magnet receiving groove 110b. The magnet receiving groove 110b may be formed in a shape corresponding to the magnet 160 such that the magnet is coupled to the magnet receiving groove 110b.

The magnet 160 is formed in an arc shape and is coupled to the rear surface of the balancer housing 110 to restrain at least one mass 141 received in the groove 150 such that the mass 141 is not separated from the groove 150. The magnet 160 may be fixed in the magnet receiving groove 110b by force fitting or using an additional coupling material.

The magnet 160 is not necessarily coupled to the rear surface of the balancer housing 110. The magnet 160 may be coupled to the front surface of the balancer housing 110 or to the side surface of the balancer housing 110 connected between the front surface and the rear surface of the balancer housing 110.

The magnet 160 restrains the mass 141 using magnetic force. Intensity of the magnetic force generated by the magnet 160 is decided based on the number of rotations per minute of the drum 30 when the mass 141 is separated from the groove 150. For example, in order to set the number of rotations per minute of the drum 30 when the mass 141 is separated from the groove 150 to 200 rpm, intensity of the magnetic force generated by the magnet 160 may be adjusted to restrain the mass 141 such that at least one mass 141 received in the groove 150 is not separated from the groove 150 in a case in which the number of rotations per minute of the drum 30 is between 0 and 200 rpm and such that the mass 141 is separated from the groove 150 in a case in which the number of rotations per minute of the drum 30 exceeds 200 rpm. Intensity of the magnetic force generated by the magnet 160 may be adjusted to a desired value based on the volume of the magnet 160, the number of the magnets 160, a magnetization mode of the magnet 160, and a material of the magnet 160.

An inclined sidewall 156 is provided at the second inner surface 111b corresponding to the first inner surface 111a in which the groove 150 is formed. As shown in FIG. 11, the inclined sidewall 156 generates supporting force Fs to support the mass 141 in a direction resisting centrifugal force Fw applied to the mass 141 during rotation of the drum 30.

The centrifugal force Fw applied to the mass 141 during rotation of the drum 30 is offset by the supporting force Fs of the inclined sidewall 156 applied to the mass 141. Consequently, magnetic force Fm generated by the magnet 160 coupled to the rear surface of the balancer housing 110 offsets the remainder of the centrifugal force Fw applied to the mass 141 after offset by the supporting force Fs of the inclined sidewall 156 applied to the mass 141, i.e. only force Fk formed along the inclined sidewall 156. When the number of rotations of the drum 30 is within a predetermined range, therefore, the movement of the mass 141 may be restrained.

As described above, the inclined sidewall 156 is provided at the second inner surface 111b corresponding to the first inner surface 111a in which the groove 150 is formed such that the centrifugal force Fw applied to the mass 141 during rotation of the drum 30 is offset by the inclined sidewall 156. Consequently, the movement of the mass 141 is effectively restrained and controlled even using magnetic force Fm having low intensity.

The inclined sidewall 156 may have an inclination angle α of about 5 to 25 degrees. The inclination angle α of the inclined sidewall 156 may be changed in the circumferential direction of the second inner surface 111b. As shown in FIG. 8, the inclined sidewall 156 includes first sections 156a and a second section 156b having different inclination angles. The second section 156b is disposed between the first sections 156a. At the first sections 156a of the inclined sidewall 156, the inclination angle α of the inclined sidewall 156 may be maintained at 5 degrees. At the second section 156b of the inclined sidewall 156, the inclination angle α of the inclined sidewall 156 may be maintained at an angle greater than 5 degrees or less than 25 degrees.

In addition, the inclination angle α of the inclined sidewall 156 may be successively increased or decreased in the circumferential direction of the second inner surface 111b.

Each mass 141 is formed of a metal material having a spherical shape. The masses 141 are movably disposed along the annular channel 110a in the circumferential direction of the drum 30 to offset unbalanced load in the drum 30 during rotation of the drum 30. When the drum 30 is rotated, centrifugal force is applied to the masses 141 in a direction in which the radius of the drum 30 is increased and the masses 141, separated from the groove 150, move along the channel 110a to perform a balancing function of the drum 30.

The masses 141 are received in the first housing 111 before the first housing 111 and the second housing 112 are welded to each other. The masses 141 may be disposed in the balancer housing 110 by welding the first housing 111 and the second housing 112 to each other in a state in which the masses 141 are received in the first housing 111.

A damping fluid 170 to prevent abrupt movement of the masses 141 is contained in the balancer housing 110.

The damping fluid 170 applies resistance to the masses 141 when force is applied to the masses 141 to prevent the masses 141 from abruptly moving in the channel 110a. The damping fluid 170 may be oil. The damping fluid 170 partially performs a balancing function of the drum 30 together with the masses 141 during rotation of the drum 30.

The damping fluid 170 is injected into the first housing 111 together with the masses 141 and is received in the balancer housing 110 by welding the first housing 111 and the second housing 112 to each other. However, embodiments of the present disclosure are not limited thereto. For example, the first housing 111 and the second housing 112 may be welded to each other and then the damping fluid 170 may be injected into the balancer housing 110 through an injection port (not shown) formed at the first housing 111 or the second housing 112 such that the damping fluid 170 is received in the balancer housing 110.

Hereinafter, the structure of the magnet 160 will be described in more detail.

Figure 12:
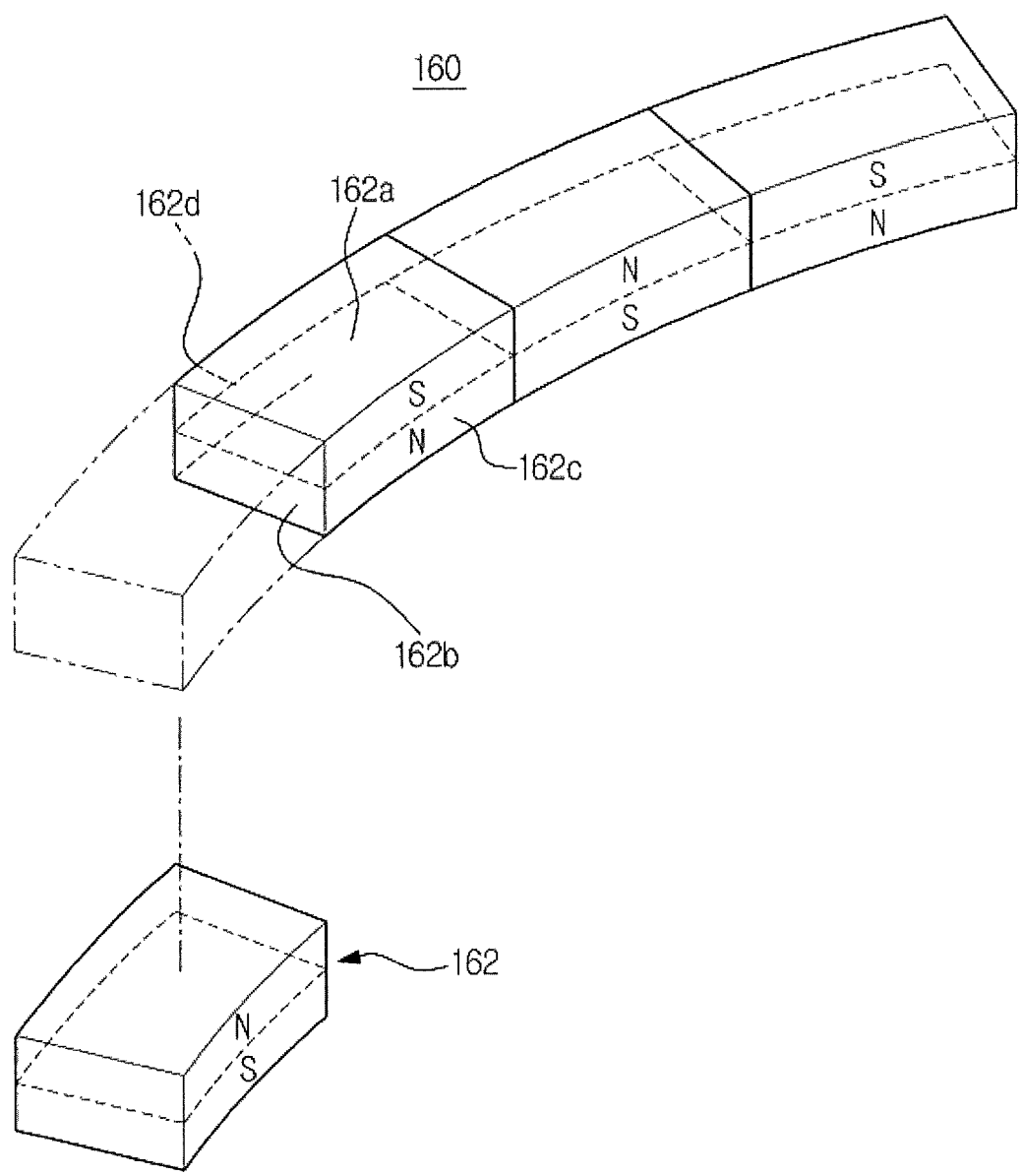
FIG. 12 is a view showing a magnet according to an embodiment of the present disclosure.
Figure 13:
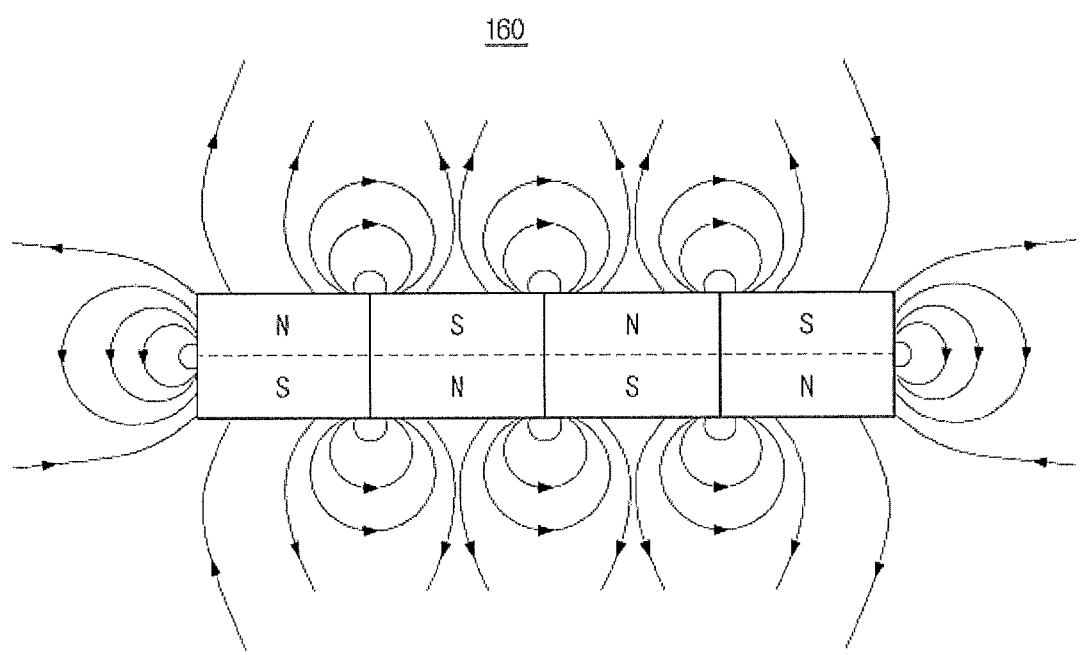
FIG. 13 is a view showing lines of magnetic force formed about the magnet according to the embodiment of the present disclosure.
Figure 14:
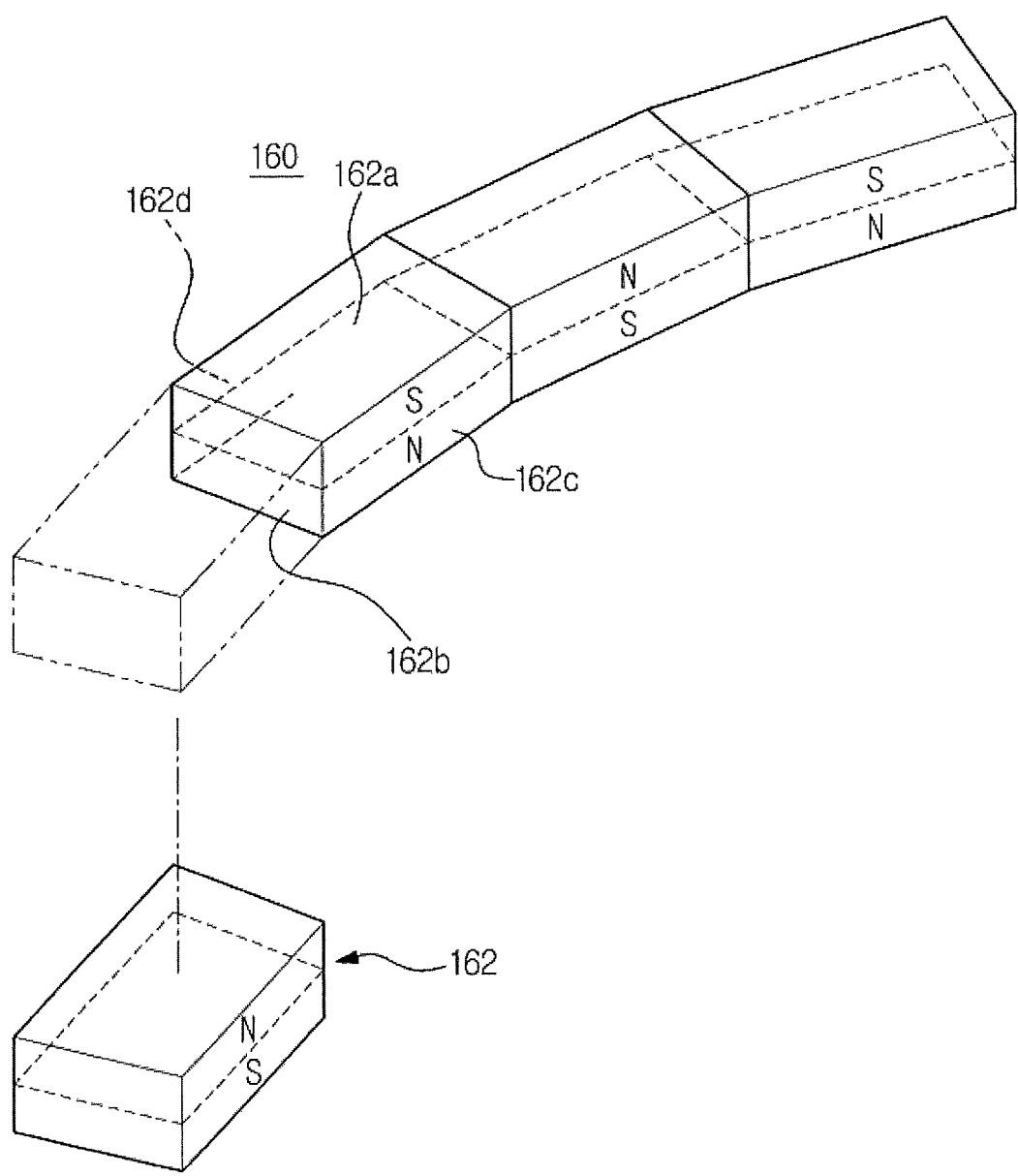
FIG. 14 is a view showing a magnet according to another embodiment of the present disclosure.

FIG. 12 is a view showing a magnet according to an embodiment of the present disclosure, FIG. 13 is a view showing lines of magnetic force formed about the magnet according to the embodiment of the present disclosure, and FIG. 14 is a view showing a magnet according to another embodiment of the present disclosure.

As shown in FIGS. 12 and 13, the magnet 160 may includes a plurality of unit magnets 162 arranged in the circumferential direction of the balancer housing 110.

Each unit magnet 162 has a pair of N and S poles. Each unit magnet 162 includes a first interface surface 162a contacting a rear surface of the first housing 111 and a second interface surface 162b contacting a neighboring unit magnet 162. An inside surface 162c and an outside surface 162d of each unit magnet 162 may be formed in an arc shape. Alternatively, the inside surface 162c and the outside surface 162d of each unit magnet 162 may be formed in a flat shape as shown in FIG. 14.

The unit magnets 162 are coupled to one another in tight contact via the first interface surfaces 162a such that no gap is present between the respective unit magnets 162. An N pole of one unit magnet 162 is coupled to an S pole of a neighboring unit magnet 162 in the circumferential direction of the balancer housing 110. An S pole of one unit magnet 162 is coupled to an N pole of a neighboring unit magnet 162 in the circumferential direction of the balancer housing 110.

In a case in which the unit magnets 162 are arranged in the circumferential direction of the balancer housing 110 in a state in which the unit magnets 162 are coupled to one another in tight contact such that no gaps are present between the respective unit magnets 162, intensity of magnetic force per unit volume of the magnet 160 is much more increased, thereby effectively restraining the masses 141, than in a case in which the magnet 160 is not divided into a plurality of unit magnets 162.

Intensity of the magnetic force generated by the magnet 160 may be adjusted to a desired value based on the volume of each unit magnet 162, the number of the unit magnets 162, and a material of each unit magnet 162.

Figure 15:
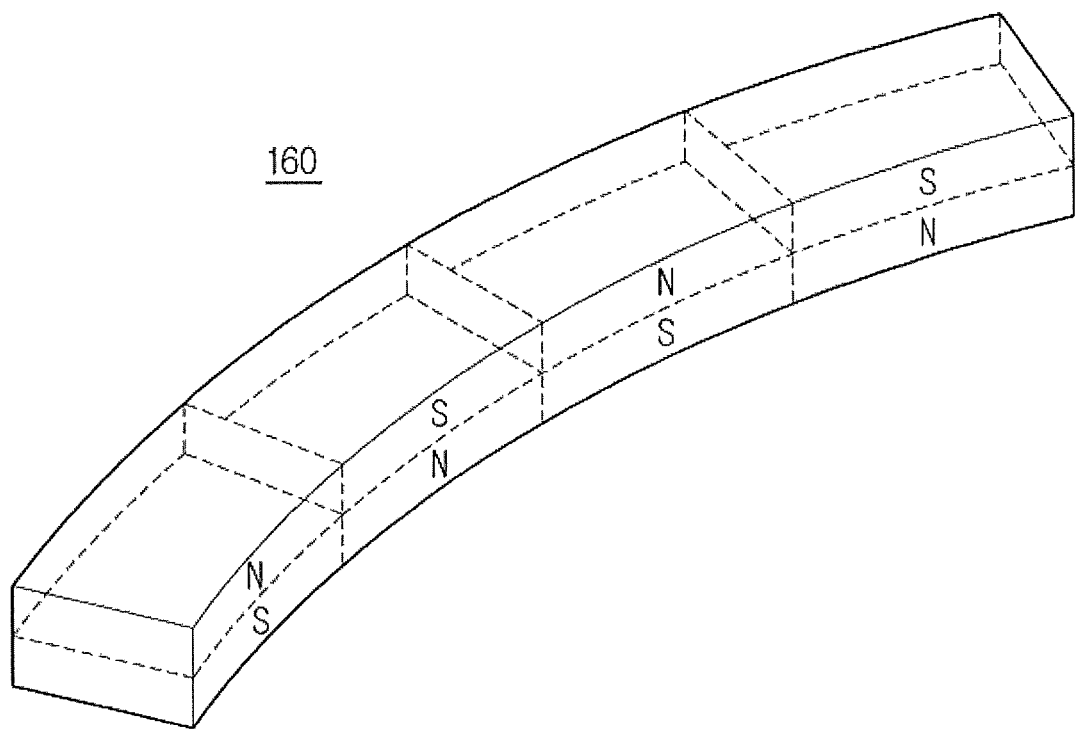
FIG. 15 is a view showing a magnet according to a further embodiment of the present disclosure.
Figure 16:
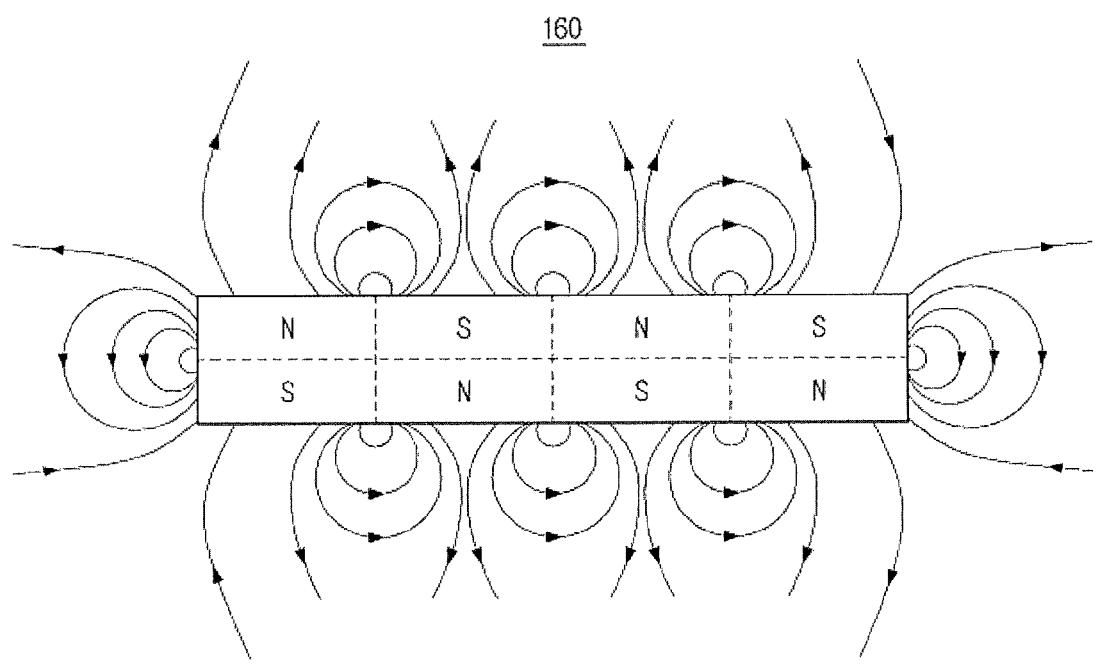
FIG. 16 is a view showing lines of magnetic force formed about the magnet according to the embodiment of the present disclosure.

FIG. 15 is a view showing a magnet according to a further embodiment of the present disclosure and FIG. 16 is a view showing lines of magnetic force formed about the magnet according to the embodiment of the present disclosure.

As shown in FIGS. 15 and 16, the magnet 160 may be formed as a single body including a plurality of N and S poles. The N poles and the S poles are alternately arranged in the circumferential direction of the balancer housing 110.

In a case in which the magnet 160 has a plurality of N and S poles alternately arranged in the circumferential direction of the balancer housing 110 as described above, intensity of magnetic force per unit volume of the magnet 160 is much more increased, thereby effectively restraining the masses 141, than in a case in which the magnet 160 has an N pole and an S pole.

Intensity of the magnetic force generated by the magnet 160 may be adjusted to a desired value based on the volume of the magnet 160, the number of the magnets 160, and a material of the magnet 160.

Figure 17:
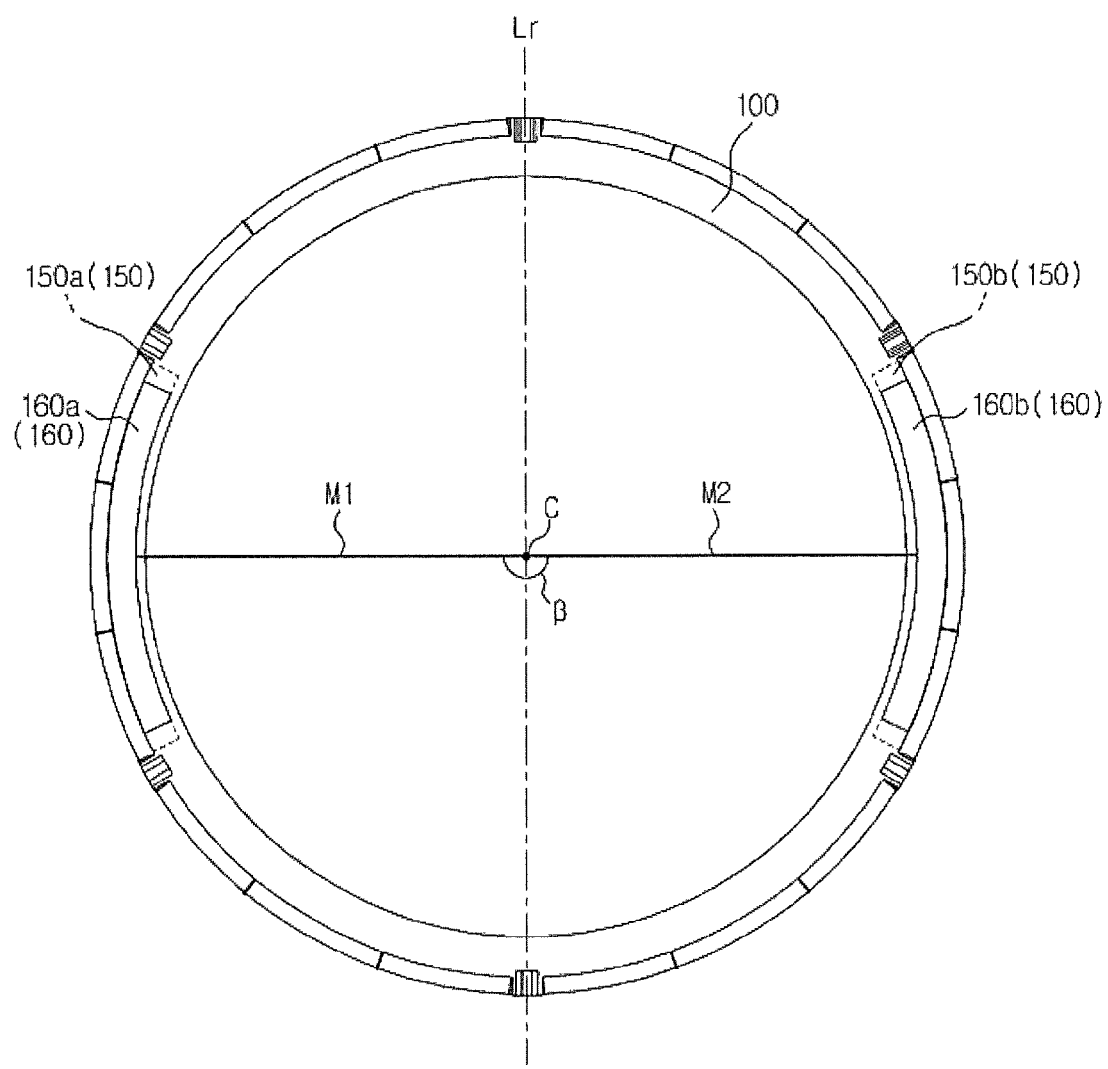
FIG. 17 is a view showing a structure in which magnets are disposed on the balancer housing.

FIG. 17 is a view showing a structure in which magnets are disposed on the balancer housing.

As shown in FIG. 17, the magnets 160 include a pair of first and second magnets 160a and 160b disposed at positions corresponding to the grooves 150 and the inclined sidewalls 156 and coupled to the rear surface of the balancer housing 110.

The first magnet 160a and the second magnet 160b may be disposed such that an angle β between a first perpendicular line M1 perpendicularly connecting the first magnet 160a and a center of rotation C of the drum 30 and a second perpendicular line M2 perpendicularly connecting the second magnet 160b and the center of rotation C of the drum 30 is between 150 and 210 degrees. Alternatively, the first magnet 160a and the second magnet 160b may be disposed such that the angle β between the first perpendicular line M1 and the second perpendicular line M2 is 180 degrees. In a case in which the angle β between the first perpendicular line M1 and the second perpendicular line M2 is 180 degrees, the first magnet 160a and the second magnet 160b are disposed symmetrically on the basis of a virtual line Lr passing through the center of rotation C of the drum 30 and perpendicular to the ground.

It is assumed that the number of rotations per minute of the drum 30 does not exceed 200 rpm and thus the masses 141 may be restrained by the magnets 160 as described above. In a case in which the number of magnets 160 is three or more, if the masses 141 are restrained between two neighboring magnets 160, the masses 141 may not move to the remaining magnets 160. Consequently, the masses 141 may not be uniformly distributed in the balancer housing 110 with the result that unbalanced load may be generated in the drum 30.

In a case in which a pair of magnets 160 is disposed symmetrically on the basis of the virtual line Lr passing through the center of rotation of the drum 30, if corresponding masses 141 are received in one groove 150a, the remaining masses 141 may be naturally received in the other groove 150b during rotation of the drum 30 and then restrained by the magnets 160. Consequently, nonuniform distribution of the masses 141 in the balancer housing 110 is prevented.

Hereinafter, a principle in which the masses 141 are restrained by the grooves 150 and the magnets 160 when the number of rotations per minute of the drum 30 is within a predetermined range and the masses 141 are separated from the grooves 150 when the number of rotations per minute of the drum 30 deviates from the predetermined range to balance the drum 30 will be described.

Figure 18:
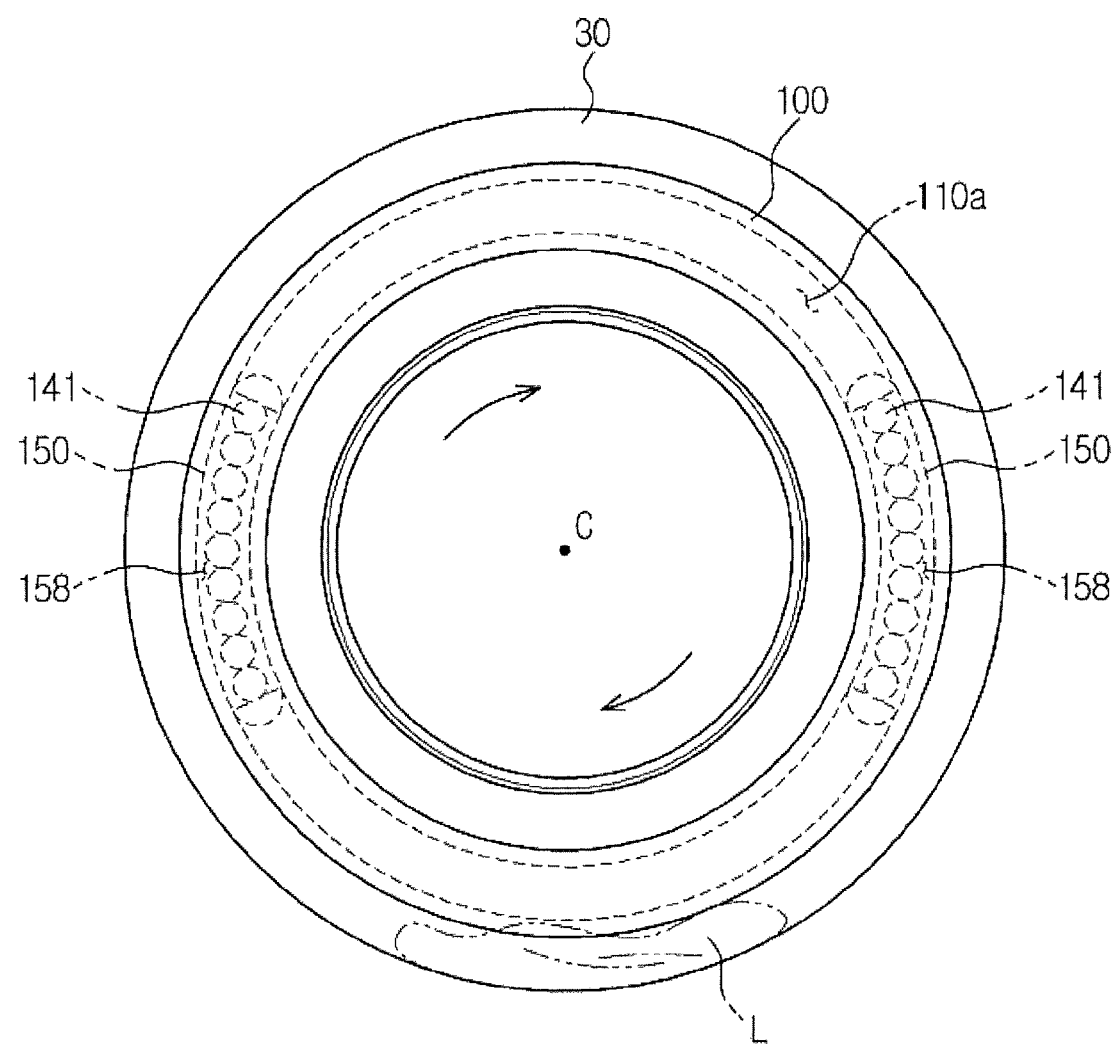
FIGS. 18 and 19 are views showing an operating principle of the balancer according to the embodiment of the present disclosure.
Figure 19:
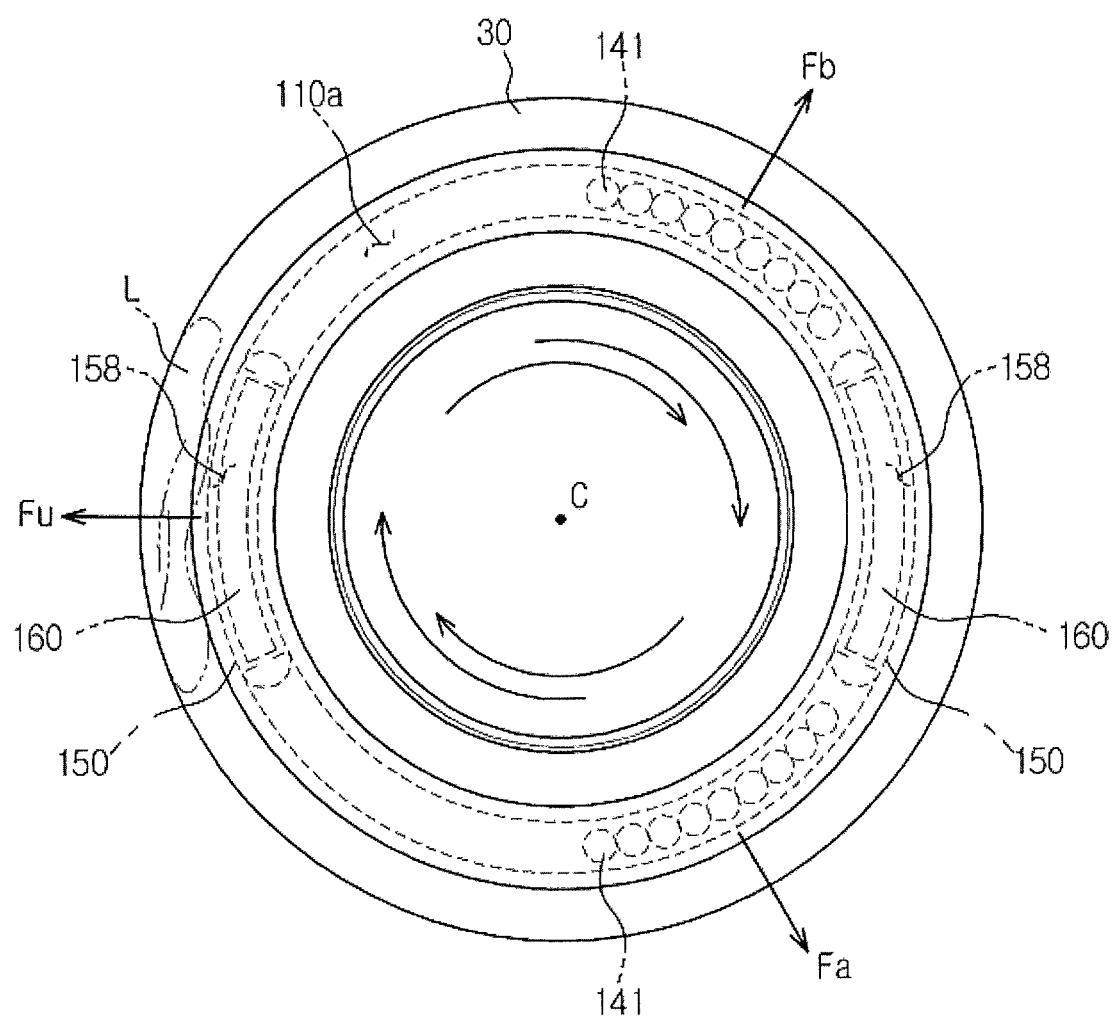

FIGS. 18 and 19 are views showing an operating principle of the balancer according to the embodiment of the present disclosure. A damping fluid 170 is omitted from FIGS. 18 and 19.

As shown in FIG. 18, when the number of rotations per minute of the drum 30 is within a predetermined range at the beginning of spin-drying of laundry, the masses 141 are received in the grooves 150 or the section increase portions 158 and movement of the masses 141 is restrained by the magnets 160.

Before spin-drying is commenced, i.e. before the drum 30 is rotated, the masses 141 are disposed at the lower part of the balancer housing 110 due to gravity. When the drum 30 is rotated to spin-dry the laundry in this state, centrifugal force is applied to the masses 141. As a result, the masses 141 move along the channel 110a of the balancer housing 110. During movement of the masses 141 along the channel 110a of the balancer housing 110, the masses 141 are received and located in the grooves 150. The movement of the masses 141 received and located in the grooves 150 is restrained by magnetic force generated by the magnets 160 before the number of rotations per minute of the drum 30 deviates from a predetermined range. For example, in a case in which the washing machine is designed such that when the number of rotations per minute of the drum 30 is 200 rpm, centrifugal force applied to the masses 141 by rotation of the drum 30, force generated by the masses 141 due to gravity, magnetic force generated by the magnets 160, and force generated by the grooves 150 to support the masses 141 are balanced, the movement of the masses 141 is restrained in a state in which the masses 141 are received and located in the grooves 150 when the number of rotations per minute of the drum 30 is between 0 and 200 rpm at the beginning of spin-drying of laundry. As described above, the movement of the masses 141 is restrained when the drum 30 is rotated at relatively low speed at the beginning of spin-drying of laundry to prevent the masses 141 from generating vibration of the drum 30 together with laundry L or to prevent the increase of vibration generated by the laundry L. In addition, noise due to vibration of the drum 30 may be reduced.

When the number of rotations per minute of the drum 30 deviates from the predetermined range, as shown in FIG. 19, the masses 141 received and restrained in the grooves 150 or the section increase portions 158 are separated from the grooves 150 or the section increase portions 158 and move along the channel 110a of the balancer housing 110 to perform a balancing function of the drum 30.

For example, in a case in which the washing machine is designed such that when the number of rotations per minute of the drum 30 is 200 rpm, centrifugal force applied to the masses 141 by rotation of the drum 30, force generated by the masses 141 due to gravity, magnetic force generated by the magnets 160, and force generated by the grooves 150 to support the masses 141 are balanced, the centrifugal force applied to the masses 141 is increased when the number of rotations per minute of the drum 30 exceeds 200 rpm. As a result, the masses 141 are separated from the grooves 150 or the section increase portions 158 and move along the channel 110a of the balancer housing 110. At this time, the masses 141 are controlled to slide and roll in a direction to offset unbalanced load Fu generated in the drum 30 due to one-side accumulation of the laundry L, i.e. a direction opposite to the direction in which the unbalanced load Fu is applied to the drum 30. Consequently, forces Fa and Fb to offset the unbalanced load Fu are generated to stabilize rotation of the drum 30.

As is apparent from the above description, the balancer effectively offsets unbalanced load applied to the drum, thereby stabilizing rotation of the drum.

In addition, vibration and noise are prevented from being generated from the drum due to the masses provided to balance the drum before the drum reaches predetermined rotational speed.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A balancer mounted to a drum of a washing machine to offset unbalanced load generated in the drum during rotation of the drum, the balancer comprising:
    a balancer housing having an annular channel defined therein, the balancer housing including a first housing opened at one side thereof and a second housing to cover the first housing to define the annular channel;
    at least one mass movably disposed in the channel; and
    at least one magnet coupled to a rear side of the first housing, the rear surface of the first housing being an outer surface of the first housing facing the drum in an axial direction of the drum,
    wherein at least one groove is formed at an inner surface of the first housing to receive the at least one mass at a position corresponding to the at least one magnet whereby the at least one mass is confined to the at least one groove by magnetic force of the at least one magnet when rotational speed of the drum is within a predetermined range,
    wherein the at least one magnet comprises a plurality of magnets arranged in a circumferential direction of the balancer housing,
    wherein each of the plurality of magnets has a pair of N and S poles arranged in an axial direction of the balancer housing,
    wherein the plurality of magnets are disposed in contact with each other such that no gap is present between the respective magnets, and
    wherein each of the plurality of magnets has an inside surface and an outside surface formed in an arc shape.

2. The balancer according to claim 1, wherein the plurality of magnets comprises a first magnet and a second magnet disposed symmetrically at the balancer housing.

3. The balancer according to claim 1, wherein each of the plurality of magnets comprises:
    a first interface surface contacting a rear surface of the first housing; and
    a second interface surface contacting a neighboring unit magnet.

* * * * *